United States Patent
Bonner et al.

(10) Patent No.: US 6,606,617 B1
(45) Date of Patent: Aug. 12, 2003

(54) OPTIMIZED TECHNIQUE FOR PREFETCHING LOB TABLE SPACE PAGES

(75) Inventors: Charles Roy Bonner, San Jose, CA (US); Robert William Lyle, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/322,317

(22) Filed: May 28, 1999

Related U.S. Application Data

(60) Provisional application No. 60/101,729, filed on Sep. 24, 1998.

(51) Int. Cl.[7] .............................................. G06F 17/30
(52) U.S. Cl. ........................... 707/2; 707/100; 707/200; 712/206; 712/207; 711/3; 711/4; 711/113; 711/118
(58) Field of Search ............................... 707/103.12, 2, 707/3, 10, 100, 101, 102; 712/206, 207; 711/4, 3, 113, 118

(56) References Cited

U.S. PATENT DOCUMENTS

| | | | |
|---|---|---|---|
| 4,509,119 A | 4/1985 | Gumaer et al. ............. 711/136 |
| 4,949,388 A | 8/1990 | Bhaskaran .................. 382/159 |
| 4,961,134 A | 10/1990 | Crus et al. ...................... 707/8 |
| 5,043,866 A | 8/1991 | Myre, Jr. et al. ........... 707/102 |
| 5,222,235 A | 6/1993 | Hintz et al. .................. 707/101 |
| 5,247,672 A | 9/1993 | Mohan ........................ 711/152 |
| 5,261,088 A | 11/1993 | Baird et al. ................. 707/206 |
| 5,291,583 A | 3/1994 | Bapat .......................... 717/137 |
| 5,295,188 A | 3/1994 | Wilson et al. ................. 380/30 |
| 5,396,623 A | 3/1995 | McCall et al. .............. 707/101 |
| 5,408,654 A | 4/1995 | Barry ........................... 707/101 |
| 5,416,915 A | 5/1995 | Mattson et al. ............. 711/114 |
| 5,418,921 A | 5/1995 | Cortney et al. ............. 711/114 |
| 5,418,940 A | 5/1995 | Mohan ........................... 714/5 |
| 5,435,004 A | 7/1995 | Cox et al. ................... 707/205 |
| 5,452,299 A | 9/1995 | Thessin et al. ............. 370/260 |
| 5,455,944 A | 10/1995 | Haderle et al. ................ 435/28 |
| 5,517,641 A | 5/1996 | Barry et al. ................. 707/101 |
| 5,566,329 A | 10/1996 | Gainer et al. ................... 707/4 |
| 5,579,499 A | 11/1996 | Fecteau et al. ............. 711/209 |
| 5,579,515 A | 11/1996 | Hintz et al. ..................... 707/7 |
| 5,630,093 A | 5/1997 | Holzhammer et al. ...... 711/115 |

(List continued on next page.)

FOREIGN PATENT DOCUMENTS

JP   8-167852   6/1996   ............. G06F/5/00

OTHER PUBLICATIONS

IBM Technical Disclosure Bulletin, "Method For Storing Large Objects in a Relational Database," vol. 35, No. 4A, pp. 72–75, Sep. 1992.
IBM Technical Disclosure Bulletin, "Reorganization Flags For Table Indexes," vol. 35, No. 5, pp. 156–157, Oct. 1992.
IBM Technical Disclosure Bulletin, "Technique to Allow DB2 Utilities and Commands to Run While SQL Applications Have a Table Space Locked," vol. 36, No. 09A, pp. 499–501, Sep. 1993.
IBM Technical Disclosure Bulletin, "Spanning Temporary Reorg Files," vol. 36, N. 06A, p. 159, Jun. 1993.
IBM Technical Disclosure Bulletin, "Segmented Relational Database Tables," vol., 38, No. 07, pp. 219–220, Jul. 1995.

(List continued on next page.)

Primary Examiner—Jean R. Homere
Assistant Examiner—Khanh Pham
(74) Attorney, Agent, or Firm—Sughrue Mion, PLLC

(57) ABSTRACT

A method, apparatus, and article of manufacture for a computer implemented technique for prefetching pages. Pages are prefetched from a database stored on a data storage device connected to a computer. Pages to be retrieved are identified. Identifiers for the identified pages are stored in multiple prefetch page lists. Concurrently, the retrieved pages are processed and prefetch commands are issued to alternating multiple prefetch page lists.

26 Claims, 7 Drawing Sheets

U.S. PATENT DOCUMENTS

| | | | |
|---|---|---|---|
| 5,666,560 A | | 9/1997 | Moertl et al. .................. 710/68 |
| 5,684,986 A | | 11/1997 | Moertl et al. ................ 707/101 |
| 5,687,343 A | | 11/1997 | Fecteau et al. .............. 711/202 |
| 5,721,915 A | | 2/1998 | Sockut et al. ................ 707/200 |
| 5,727,197 A | | 3/1998 | Burgess et al. ................. 707/2 |
| 5,732,402 A | | 3/1998 | Lehman ....................... 707/205 |
| 5,737,601 A | | 4/1998 | Jain et al. .................... 707/201 |
| 5,742,806 A | | 4/1998 | Reiner et al. ................... 707/3 |
| 5,742,810 A | | 4/1998 | Ng et al. ........................ 707/4 |
| 5,758,357 A | | 5/1998 | Barry et al. ................. 707/202 |
| 5,761,667 A | | 6/1998 | Koeppen .................... 707/101 |
| 5,765,213 A | * | 6/1998 | Ofer ............................ 711/213 |
| 5,857,203 A | * | 1/1999 | Kauffman et al. ........... 707/200 |
| 5,887,151 A | * | 3/1999 | Raz et al. .................... 712/206 |
| 5,999,943 A | * | 12/1999 | Nori et al. ................... 707/104 |
| 6,061,678 A | * | 5/2000 | Klein et al. ..................... 707/3 |
| 6,092,154 A | * | 7/2000 | Curtis et al. ................. 711/113 |

OTHER PUBLICATIONS

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996.

MJ Carey, et al., "Object And File Management in The EXODUS Extensible Database System," Proceedings of Very Large Data Bases. Twelfth International Conference on Very Large Data Bases, Kyoto, Japan, pp. 99–100, Aug. 25–28, 1986.

ML McAuliffe, et al., "Towards Effective and Efficient Free Space Management," 1996 ACM SIGMOD International Conference on Management of Data, Montreal, Quebec, Canada, Jun. 4–6, 1996.

C. Mohan, "Disk Read–Write Optimizations and Data Integrity in Transaction Systems Using Write–Ahead Logging," Proceedings of the Eleventh International Conference on Data Engineering (Cat. No. 95CH35724,) Taipei, Taiwan, Mar. 6–10, 1995.

Ki Sik Pang, et al., "An Efficient Recovery Scheme For Large Data in Multimedia DBMS," Journal of the Korea Information Science Society, vol. 22, No. 2, pp. 206–217, Feb. 1995.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994.

Martin Marshall, "Time Warner Big on Oracle Objects. (Testing Oracle 8's Ability to Move Large Object Blocks)," (Company Operations), (Brief Article), Communications Week Issue: n676, pp. 1–3, Aug. 11, 1997.

HweeHwa Pang, "Tertiary Storage in Multimedia Systems: Staging or Direct Access?", Multimedia Systems, vol. 5, Issue: 6, pp. 386–399, Dec. 1, 1997.

Dr. Michael Stonebraker, "The Empire Strikes Back: DB2 Universal Database," http://www.oreview.com/9704side.htm, pp. 1–7, 1997.

GH Sokut, "A Method For On–Line Reorganization of a Database," IBM Systems Journal, vol.. 36, No. 3 pp. 411–436, 1997.

H. Koide, et al., "A New Memory Allocation Method For Shared Memory Multiprocessors With Large Virtual Address Space," Concurrency: Practice and Experience, vol. 9, No. 9, pp. 897–914, Sep. 1997.

* cited by examiner

FIG. 5

LOB Map — 500

| Starting Page Number | Count of Pages in this Section |
|---|---|
| 20 | 1 |
| 1000 | 16 |
| ... | ... |

OPTIMIZED TECHNIQUE FOR PREFETCHING LOB TABLE SPACE PAGES

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO RELATED APPLICATIONS

This application is related to the following co-pending and commonly-assigned patent applications:

application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al.;

application Ser. No. 09/321,675, entitled "A FAST TECHNIQUE FOR RECOVERING AN INDEX ON AN AUXILIARY TABLE," filed on same date herewith, by Robert W. Lyle et al.;

application Ser. No. 09/322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

application Ser. No. 09/322,286, entitled "A TECHNIQUE FOR CREATING A UNIQUE QUASI-RANDOM ROW IDENTIFIER," filed on same date herewith, by Robert W. Lyle et al.;

application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.;

application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al.; and application Ser. No. 09/322,316, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to an optimized technique for prefetching LOB pages.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables, are stored on DASD, such as magnetic or optical disk drives for semi-permanent storage.

A table space can be a system managed space (e.g., an operating system file system) or a database managed space. Each table space is physically divided into equal units called pages or data pages. Each page, which typically contains 4 K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file.

Traditionally, a RDBMS stored simple data, such as numeric and text data. In a traditional RDBMS, the underlying storage management has been optimized for simple data. More specifically, the size of a record is limited by the size of a page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space. The large object data is stored on a page referred to as a LOB page.

Waiting for a page to be read from DASD is unproductive and increases the elapsed time of database accesses. Some DBMSs address the problem in the data and index pagesets by using prefetch (sequential prefetch, sequential detection, and list prefetch), but these techniques may prefetch unnecessary pages and may not read some necessary pages when prefetching LOB pages.

Therefore, there is a need in the art for an improved technique to ensure that only needed pages are prefetched from DASD.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented optimized technique for prefetching pages.

In accordance with the present invention, pages are prefetched from a database stored on a data storage device connected to a computer. Pages to be retrieved are identified. Identifiers for the identified pages are stored in multiple prefetch page lists. Concurrently, the retrieved pages are processed and prefetch commands are issued to alternating multiple prefetch page lists.

BRIEF DESCRIPTION OF THE DRAWINGS

Referring now to the drawings in which like reference numbers represent corresponding parts throughout:

FIG. 5 is a block diagram illustrating an exemplary LOB map 500;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
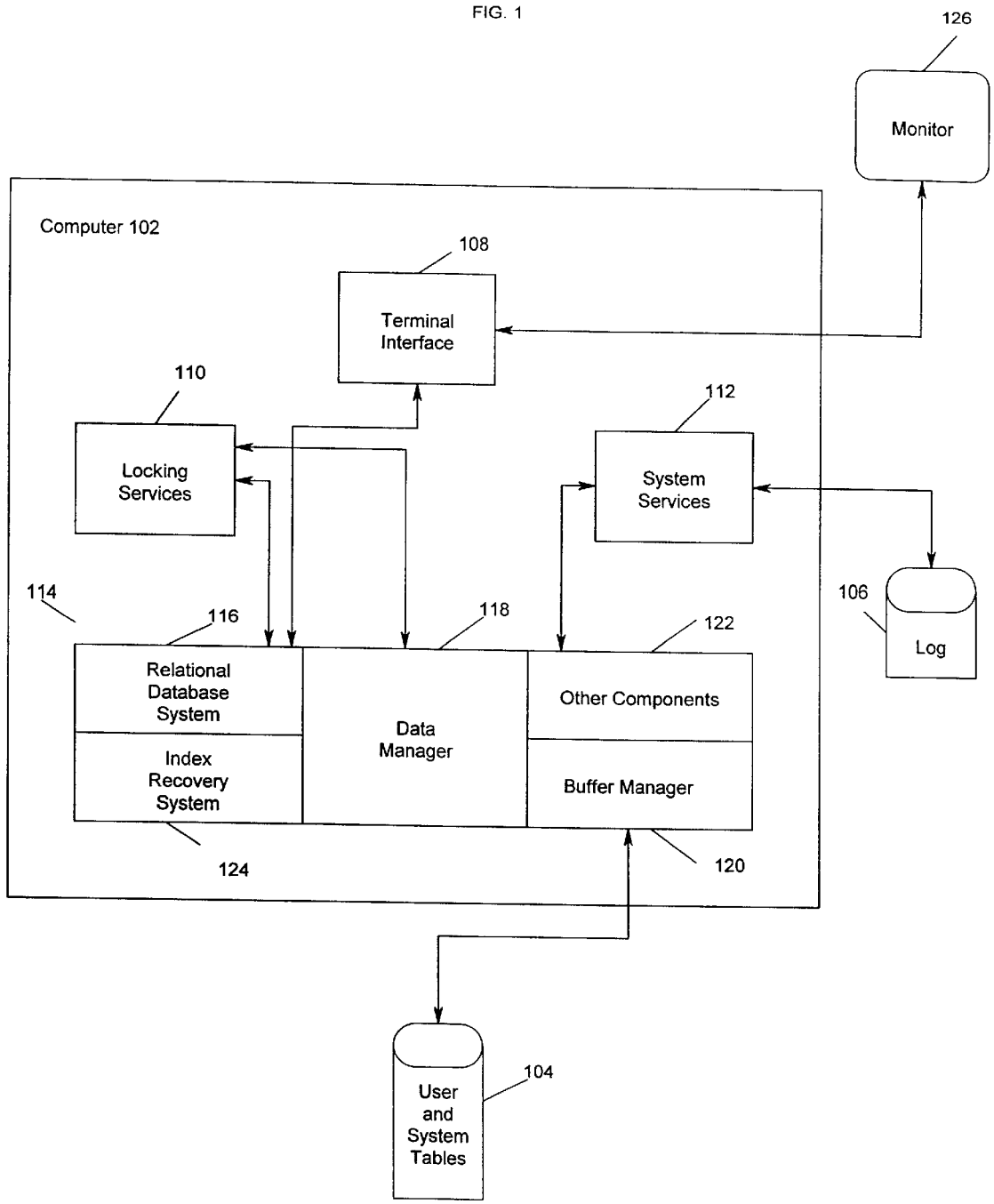
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating systems. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Prefetch System 124, and other components 122 such as an SQL compiler/interpreter. These submodules support the functions of the SQL language, i.e. definition, access control, interpretation, compilation, database retrieval, and update of user and system data. The Prefetch System 124 works in conjunction with the other submodules to prefetch LOB pages.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

An Optimized Technique For Prefetching LOB Pages

The prefetch system 124 of the present invention describes a new technique for prefetching pages asynchronously into buffers to ensure that the correct set of pages are read and are available in the buffers when needed. The set of required pages is determined prior to processing and placed in one or more lists called "prefetch page lists" ("PFPLs"). The input/output ("I/O") for the pages in the prefetch page lists is scheduled asynchronously. The prefetch works well whether the pages are contiguous or non-contiguous in physical storage.

In particular, multiple lists are used to balance I/Os with processing. In one embodiment of the invention, two lists are used, but the number of lists can be increased to balance I/O with CPU. Similarly, the size of the lists can be varied. In the case of two lists, one list is filled with the page numbers of pages to be retrieved, a prefetch command is issued to retrieve pages in that first list. A second list is filled with the page numbers of pages to be retrieved, and a prefetch command is issued to retrieve pages in that second list. As pages are retrieved for the first list, these pages are processed. While these pages are being processed, the pages in the other list are prefetched, thus, the I/O for pages in the other list is occurring concurrently. When all of the pages of one list are processed, that list is filled with a new set of pages to be retrieved, and a prefetch command is issued to retrieve these new pages, while the pages retrieved for the other list is processed.

Use of this prefetch system 124 is directly applicable to various LOB table space pages (e.g., LOB low-level space map pages, LOB map pages, and LOB pages, which will be described in further detail below). The prefetch system 124 can also be applied to other data pages and index pages. One skilled in the art would recognize that the examples above are for illustration only and do not limit the invention. Rather, the principles of the prefetch system 124 can be applied to retrieving many objects.

LOB Table Space Organization

Prior to discussing the prefetch system 124 in further detail, a discussion of LOB table spaces will be provided.

Figure 2:
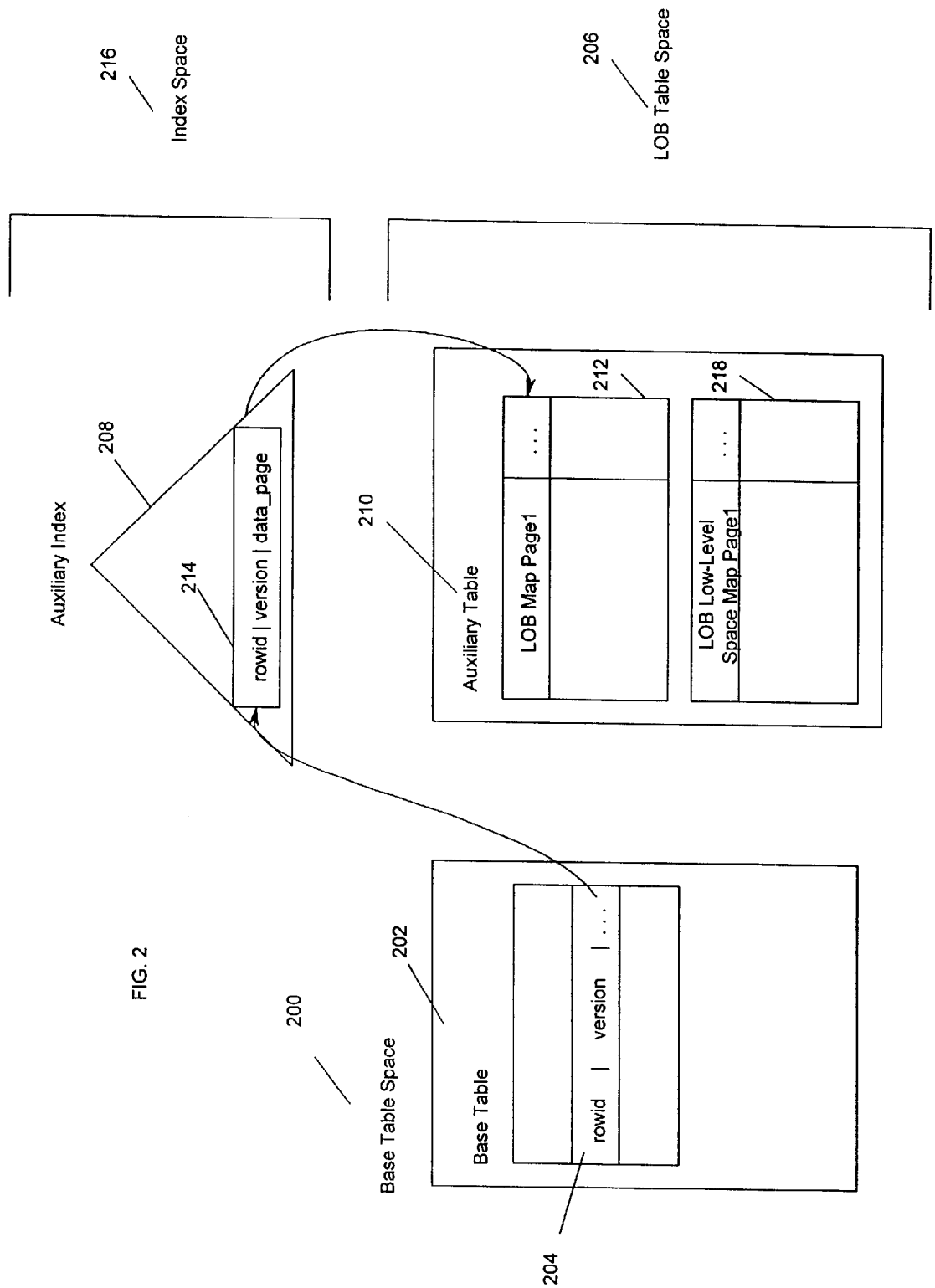
FIG. 2 is a block diagram illustrating an exemplary base table space and LOB table space.

FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version), and other columns (indicated with the ellipses). The prefetch system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The prefetch system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page1 218. LOB low-level space map pages assist in allocating and deallocating LOB pages. A high-level space map identifies the low-level space map pages.

Figure 3:
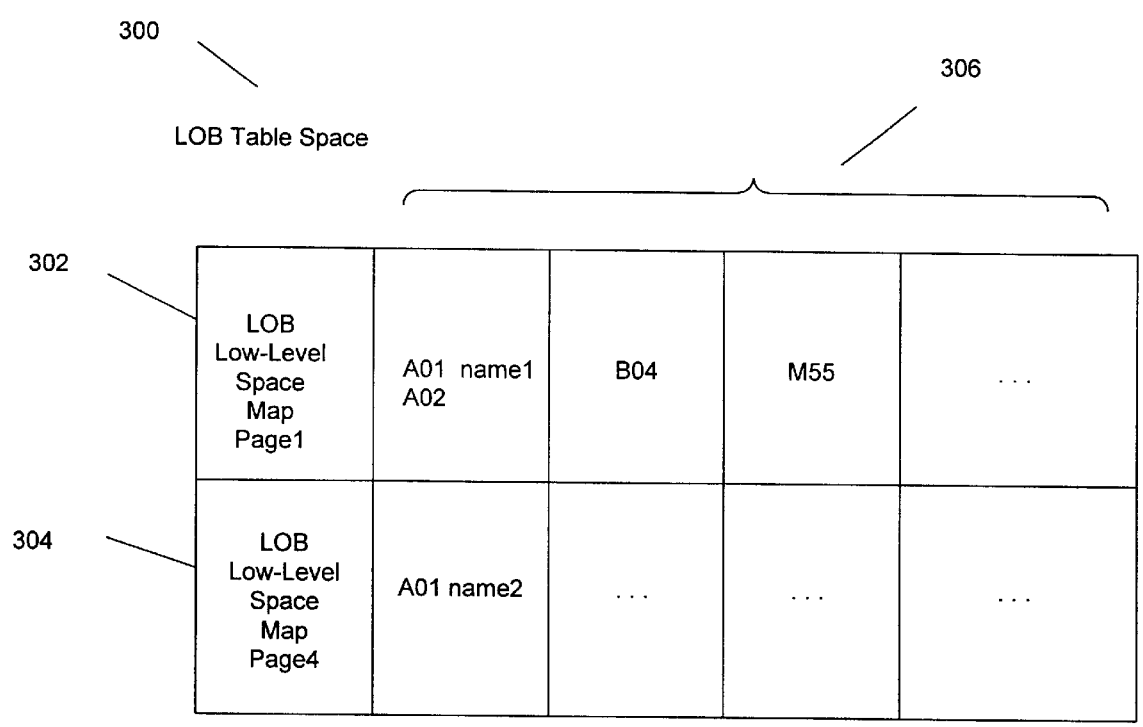
FIG. 3 is a block diagram illustrating an exemplary table space containing LOB low-level space map pages and LOB pages.

FIG. 3 is a block diagram illustrating an exemplary table space containing LOB low-level space map pages and LOB pages. A table space 300 contains a number of LOB low-level space map pages 302, 304. Each LOB low-level space map page 302, 304 covers a number of LOB pages 306. Each LOB page is allocated to one LOB, even if the LOB uses only a portion of the LOB page. For example, one LOB may be stored on 17 and a half LOB pages, but the LOB page that is half used is not allocated to any other LOB. Each LOB low-level space map page 302, 304 covers a fixed range of LOB pages 306. A LOB low-level space map page 302, 304 identifies the LOB pages 306 that have not yet been allocated to a LOB. When inserting a LOB, one or more LOB low-level space map pages 302, 304 are accessed to find LOB pages that may be allocated to the LOB. All LOB pages within a single table space have the same page size. A page may contain, for example, 4096 bytes.

Figure 4:
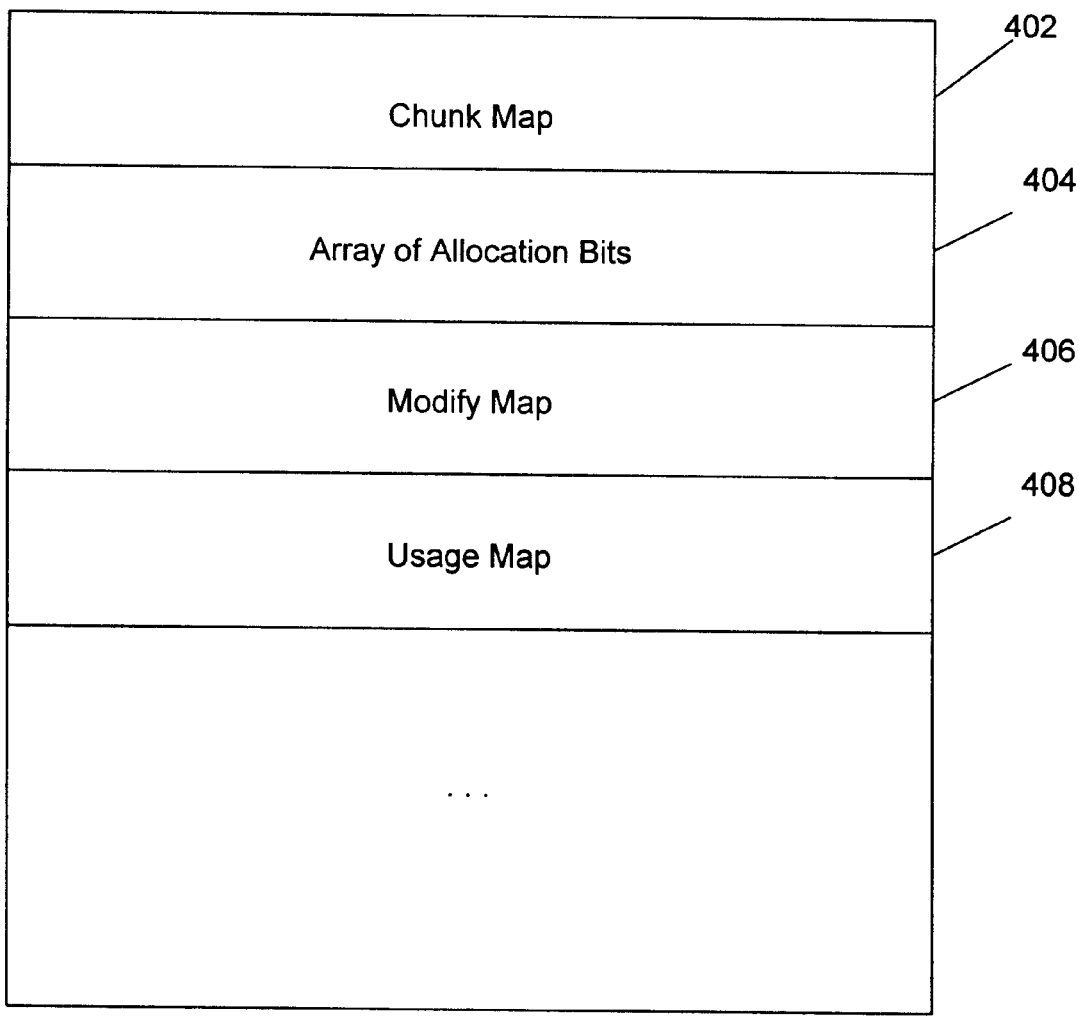
FIG. 4 is a block diagram illustrating an exemplary LOB low-level space map page.

FIG. 4 is a block diagram illustrating an exemplary LOB low-level space map page 400. LOB low-level space map page 400 contains a chunk map 402, an array of allocation bits 404, a modify map 406, a usage map 408, and other information, as indicated by the ellipses. The chunk map 402 is a series of two bit entries that indicate for each chunk whether that chunk is empty, partially used, fully used, or allocated to a single LOB. The array of allocation bits 404 has two bit entries that indicate whether each LOB page covered by the LOB low-level space map page 400 is unallocated, has been deallocated, is allocated, or is allocated and is the first page allocated to a LOB. The modification map 406 indicates for each page covered by the LOB low-level space map page 400 whether that page has been modified since the last time the page was copied. The usage map 408 has an entry for each page covered by the LOB low-level space map page 400. For each page, the usage map 408 provides a row identifier and version number to uniquely identify a LOB to which that page is allocated. Moreover, the usage map 408 indicates, for each page that is the first page allocated to a LOB, whether the LOB is well inserted or "perfectly chunked" (i.e., an organization state).

FIG. 5 is a block diagram illustrating an exemplary LOB map 500. For each LOB, the LOB map 500 identifies the starting page number for the LOB 502 (i.e., the first page allocated to the LOB) and the number of pages 504 allocated to the section. For example, the first page of a LOB may start at page 20 and has one page allocated to it. The next page of the LOB starts at page 1000 and has 16 pages allocated to it. Each LOB has one LOB map, which could be multiple LOB pages long. That is, each LOB map page contains the directory of pages that belong to one LOB.

Examples and Flow Diagram

Many different operations may use prefetch page lists. In the following example, an SQL query with LOB access utilizes the prefetch page list. The prefetch system 124 identifies the set of LOB pages that make up a LOB without reading the entire LOB pageset. Instead, the prefetch system 124 uses the LOB map pages to identify the LOB pages that are allocated to the LOB.

In the following example, the LOB is allocated to pages 20, 1000–1015, 50, and 51. The LOB map is logically represented as follows in Table 1:

TABLE 1

| Starting Page Number | Count of Pages in this Section |
|---|---|
| 20 | 1 |
| 1000 | 16 |
| 50 | 2 |

The prefetch system 124 extracts the LOB page numbers from the LOB map page and adds the LOB page numbers to the prefetch page list. The prefetch page list is used as input to the buffer manager prefetch routine, which causes the I/O to be scheduled asynchronously. The buffer manager prefetch routine does not require that consecutive pages in the prefetch page list be contiguous. The following is an example of a prefetch page list used for the LOB pages in Table 1:

| Prefetch Page List |
|---|
| 20 |
| 1000 |
| 1001 |
| ... |
| 1015 |
| 50 |
| 51 |

The ellipses in the prefetch page list indicate that the LOB page numbers ranging between LOB page numbers 1000 and 1015 are also in the prefetch page list.

Other LOB table space accesses also utilize the prefetch technique of the prefetch system 124. The following operations also employ the prefetch page list to schedule I/O asynchronously.

Mass delete (DELETE FROM)

CHECK INDEX

RECOVER INDEX

REORG

Whereas the SQL query with LOB access processes LOB pages, these operations primarily process space map pages. The space map pages are clustered throughout the LOB table space and are not contiguous. The space map page numbers are used to fill the prefetch page lists before scheduling I/O.

In addition to ensuring only needed pages are read from DASD, the prefetch system 124 enables overlapped I/O. For example, a SQL query with LOB access and the operations that process space map pages utilize two prefetch page lists to perform overlapped I/O.

Figure 6:
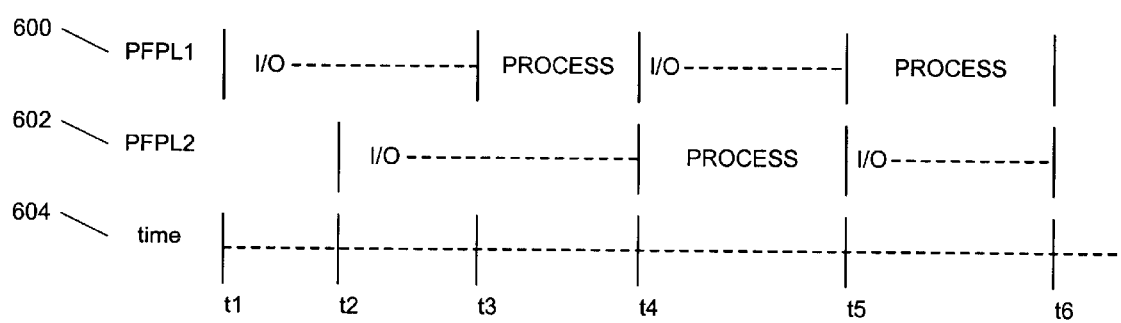
FIG. 6 is a diagram illustrating an example of the use of two prefetch page lists.

FIG. 6 is a diagram illustrating an example of the use of two prefetch page lists. Initially, a first prefetch page list 600 and a second prefetch page list 602 are initially filled with page numbers. In one embodiment of the invention, each prefetch page list contains 64 page entries. Once all of the pages in the first prefetch page list 600 have been retrieved into a buffer and processed, the next set of pages to be retrieved are determined, placed into the first prefetch page list 600, and the I/O scheduled to retrieve them. While the most recently scheduled I/O completes, the pages prefetched using the second prefetch page list 602 is being processed. In one embodiment, the prefetch system 124 alternates between the two prefetch page lists until all pages are processed. The description of two prefetch page lists is provided for illustration and is not intended to limit the invention. Additionally, one skilled in the art would recognize that any number of prefetch page lists could be used.

In particular, the timeline 604 represents the timing of processing for the example of FIG. 6. In the timeline, the values "t1" to "t6" represent increasing values as time passes. At time "t1", the prefetch system 124 schedules the I/O for the pages in the first prefetch page list 600. At time "t2", the prefetch system 124 schedules the I/O for the pages in the second prefetch page list 602. At time "t3", the I/O is completed on the first page identified in the first prefetch page list 600, and the prefetch system 124 starts processing pages identified in the first prefetch page list 600 that were retrieved into a buffer. The I/O on the other pages (i.e., pages 2–n) identified in the first prefetch page list 600 continues and occur concurrently with the I/O on the pages identified in the second prefetch page list 602. At time "t4", the prefetch system 124 has finished processing all of the pages in the first prefetch page list 600. Therefore at time "t4", the prefetch system 124 refills the first prefetch page list 600 and schedules the I/O for the pages identified in the first prefetch page list 600, and then starts processing pages identified in the second prefetch page list 602. At time "t5", the prefetch system 124 has finished processing the pages in the second prefetch page list 602, and so the prefetch system 124 refills the second prefetch page list 602, schedules I/O for the pages identified in the second prefetch page list 602, and starts processing the pages retrieved using the first prefetch page list 600.

Figure 7:
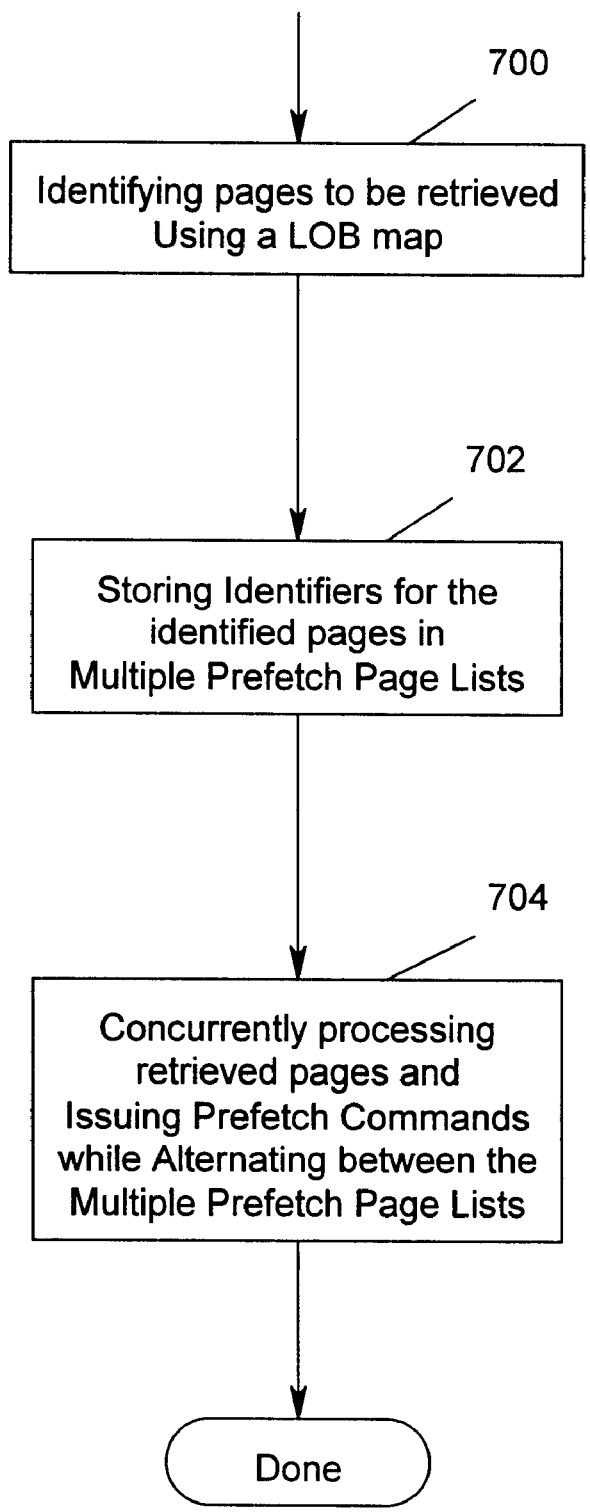
FIG. 7 is a flow diagram illustrating steps performed by the prefetch system to prefetch pages.

FIG. 7 is a flow diagram illustrating the steps performed by the prefetch system 124 to prefetch pages. In Block 700, the prefetch system 124 identifies pages to be retrieved using a LOB map. In Block 702, the prefetch system 124 stores identifiers for the identified pages in multiple prefetch page lists. In Block 704, the prefetch system 124 concurrently processes retrieved pages and issues prefetch commands while alternating between the multiple prefetch page lists.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of prefetching data from a database stored on a data storage device connected to a computer, wherein the method comprises:

identifying data to be retrieved;

creating a plurality of prefetch page lists;

accessing at least one space map comprising page identifiers that logically represent pages in the database associated with the identified data, the at least one space map being stored within the database, and retrieving page identifiers for the identified data and storing the retrieved page identifiers in the plurality of prefetch page lists; and executing the prefetch page lists by alternating between each prefetch page list that comprises the plurality of prefetch page lists, wherein identified pages retrieved by one of the prefetch page lists are processed while prefetch commands are concurrently issued by another one of the prefetch page lists.

2. The method of claim 1, wherein the at least one space map is a LOB map.

3. The method of claim 2, wherein the LOB map identifies a starting page number allocated to a LOB along with a total number of pages allocated to the LOB.

4. The method of claim 1, wherein pages identified in the prefetch page lists are non-contiguous in physical storage.

5. The method of claim 1, wherein pages identified in the prefetch page lists are contiguous in physical storage.

6. The method of claim 1, the method further comprises processing all of the pages retrieved using on of the prefetch page lists before processing pages retrieved using another prefetch page list.

7. The method of claim 1, the method further comprises, after all of the pages identified in one of the prefetch page lists are processed, storing identifiers for new pages in that prefetch page list for use in prefetching pages and scheduling prefetch for that prefetch page list.

8. An apparatus for prefetching data from a database, comprising:

a computer having a data storage device connected thereto, wherein the data storage device stores the database;

one or more computer programs, performed by the computer, for identifying data to be retrieved, creating a plurality of prefetch page lists, accessing at least one space map comprising page identifiers that logically represent pages in the database associated with the identified data, the at least one space map being stored within the database, and retrieving page identifiers for the identified data and storing the retrieved page identifiers in the plurality of prefetch page lists, and executing the prefetch page lists by alternating between each prefetch page list that comprises the plurality of prefetch page lists, wherein identified pages retrieved by one of the prefetch page lists are processed while prefetch commands are concurrently issued by another one of the prefetch page lists.

9. The apparatus of claim 8, wherein the at least on space map is a LOB map.

10. The apparatus of claim 9, wherein the LOB map identifies a starting page number allocated to a LOB along with a total number of pages allocated to the LOB.

11. The apparatus of claim 8, wherein pages identified in the prefetch page lists are non-contiguous in physical storage.

12. The apparatus of claim 8, wherein pages identified in the prefetch page lists are contiguous in physical storage.

13. The apparatus of claim 8, further comprising the means for processing all of the pages retrieved using one of the prefetch page lists before processing pages retrieved using another prefetch page list.

14. The apparatus of claim 8, further comprising the means for, after all of the pages identified in one of the prefetch page lists are processed, storing identifiers for new pages in the prefetch page list for use in prefetching pages and scheduling prefetch for the prefetch page list.

15. An article of manufacture comprising a computer program carrier readable by a computer and embodying one or more instructions executable by the computer to perform a method for prefetching data from a database stored in a data storage device connected to the computer, wherein the method comprises:

identifying data to be retrieved;

creating a plurality of prefetch page lists;

accessing at least one space map comprising page identifiers that logically represent pages in the database associated with the identified data, the at least one space map being stored within the database, and retrieving page identifiers for the identified data and storing the retrieved page identifiers in the plurality of prefetch page lists; and executing the prefetch page lists by alternating between each prefetch page list that comprises the plurality of prefetch page lists, wherein identified pages retrieved by one of the prefetch page lists are processed while prefetch commands are concurrently issued by another one of the prefetch page lists.

16. The article of manufacture of claim 15, wherein the at least one space map is LOB map.

17. The article of manufacture of claim 16, wherein the LOB map identifies a starting page number allocated to a LOB along with a total number of pages allocated to the LOB.

18. The article of manufacture of claim 15, wherein pages identified in the prefetch page lists are non-contiguous in physical storage.

19. The article of manufacture of claim 15, wherein pages identified in the prefetch page lists are contiguous in physical storage.

20. The article of manufacture of claim 15, the method further comprises processing all of the pages retrieved using one of the prefetch page lists before processing pages retrieved using another prefetch page list.

21. The article of manufacture of claim 15, the method further comprises, after all of the pages identified in one of the prefetch page lists is processed, storing identifiers for new pages in that prefetch page list for use in prefetching pages and scheduling prefetch for that prefetch page list.

22. The apparatus of claim 8, further comprising one or more computer programs that process all of the pages retrieved using one of the prefetch page lists before processing pages retrieved using another prefetch page list.

23. The apparatus of claim 8, further comprising one or more computer programs that, after all of the pages identified in one of the prefetch page lists are processed, store identifiers for new pages in that prefetch page list for use in prefetching pages and scheduling prefetch for that prefetch page list.

24. The method of claim 3, wherein a page number allocated to a LOB is inserted into one of the plurality of prefetch page lists.

25. The apparatus of claim 10, wherein a page number allocated to a LOB is inserted into one of the plurality of prefetch page lists.

26. The article of manufacture of claim 16, wherein a page number allocated to a LOB is inserted into one of the plurality of prefetch page lists.

* * * * *